Aug. 8, 1950 R. I. KUFFLER 2,517,889
METHOD AND APPARATUS FOR APPLYING PREFORMED
BANDS TO TIRE BUILDING DRUMS
Filed Feb. 26, 1948 6 Sheets-Sheet 1
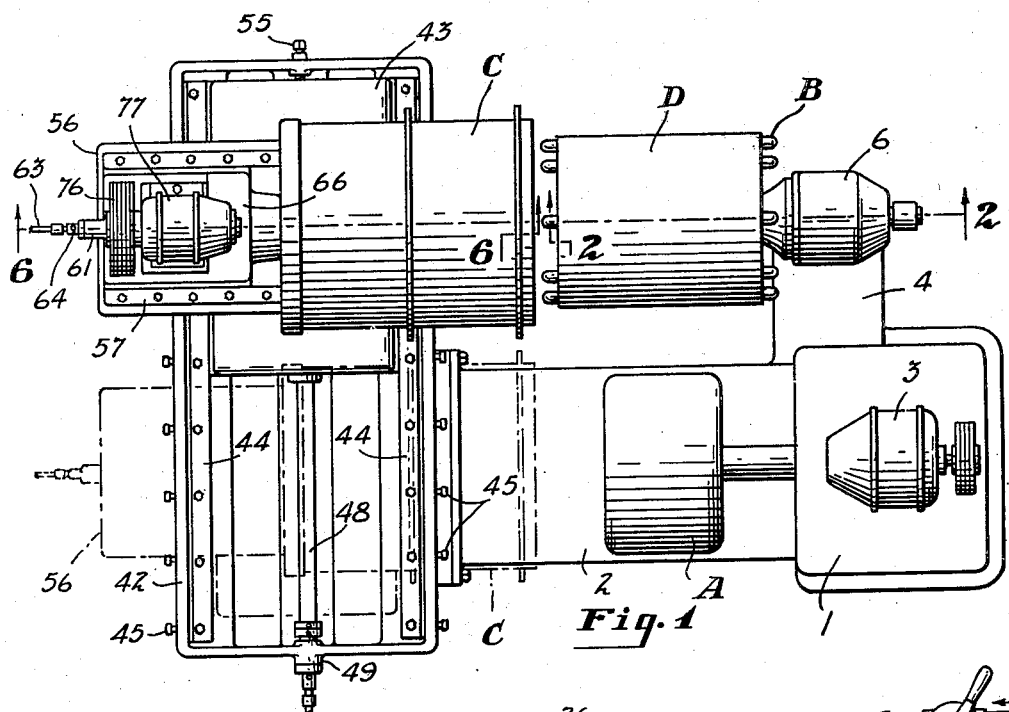
Fig. 1
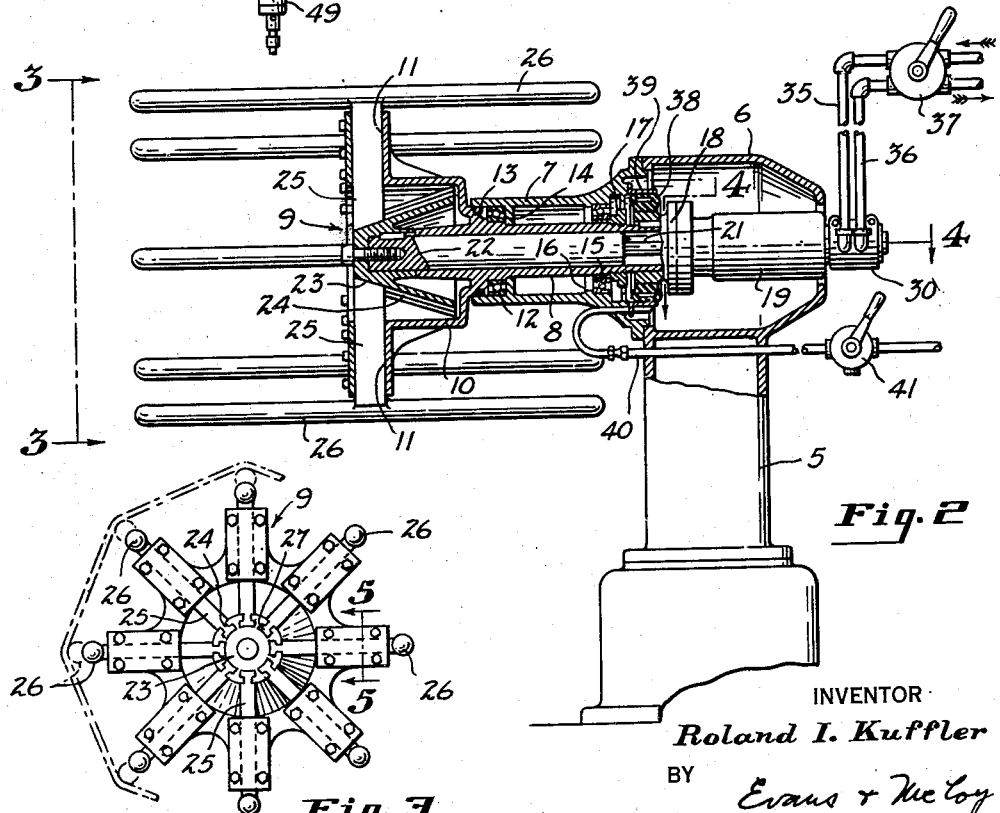
Fig. 2
Fig. 3
INVENTOR
Roland I. Kuffler
BY Evans & McCoy
ATTORNEYS

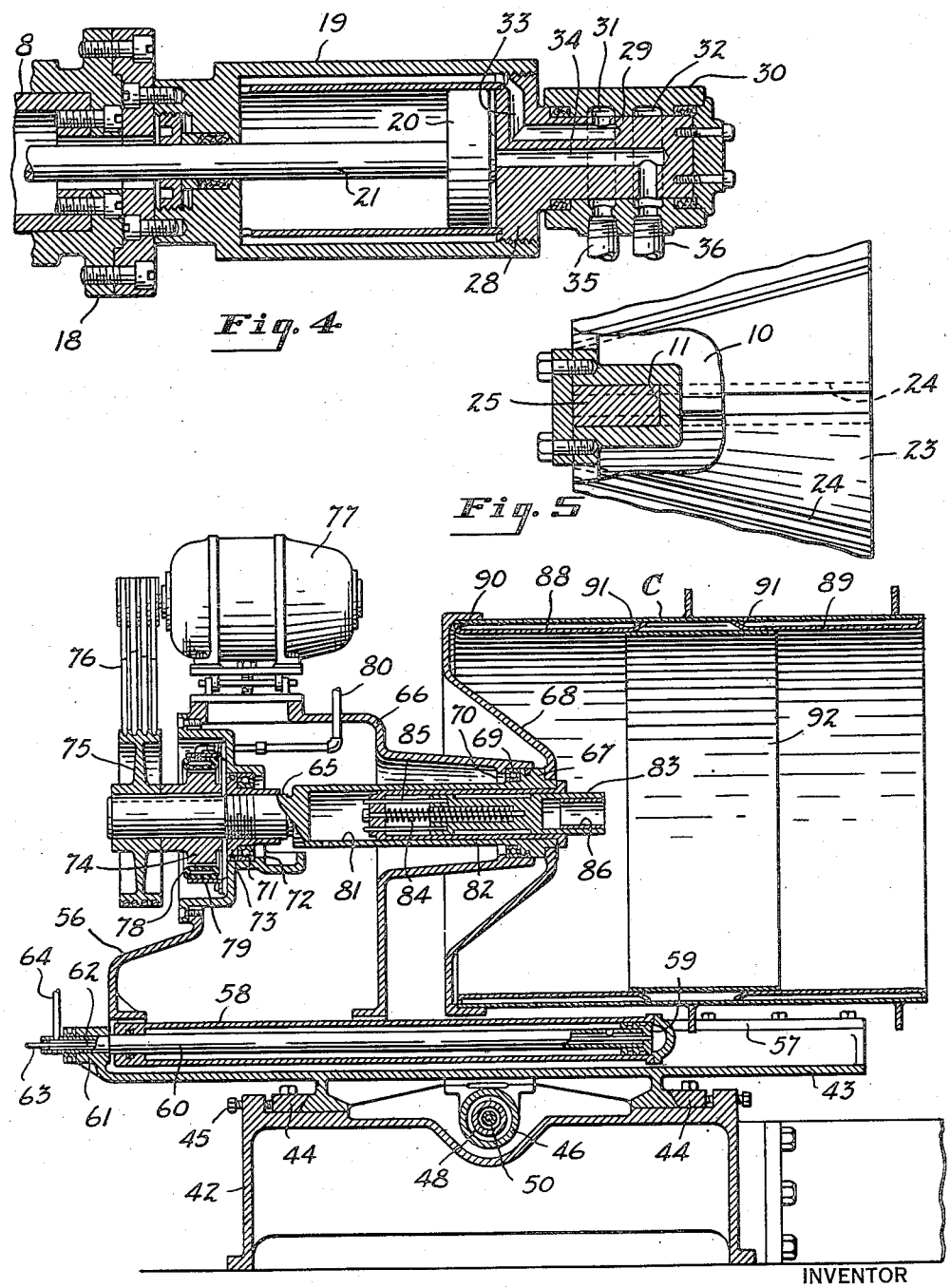

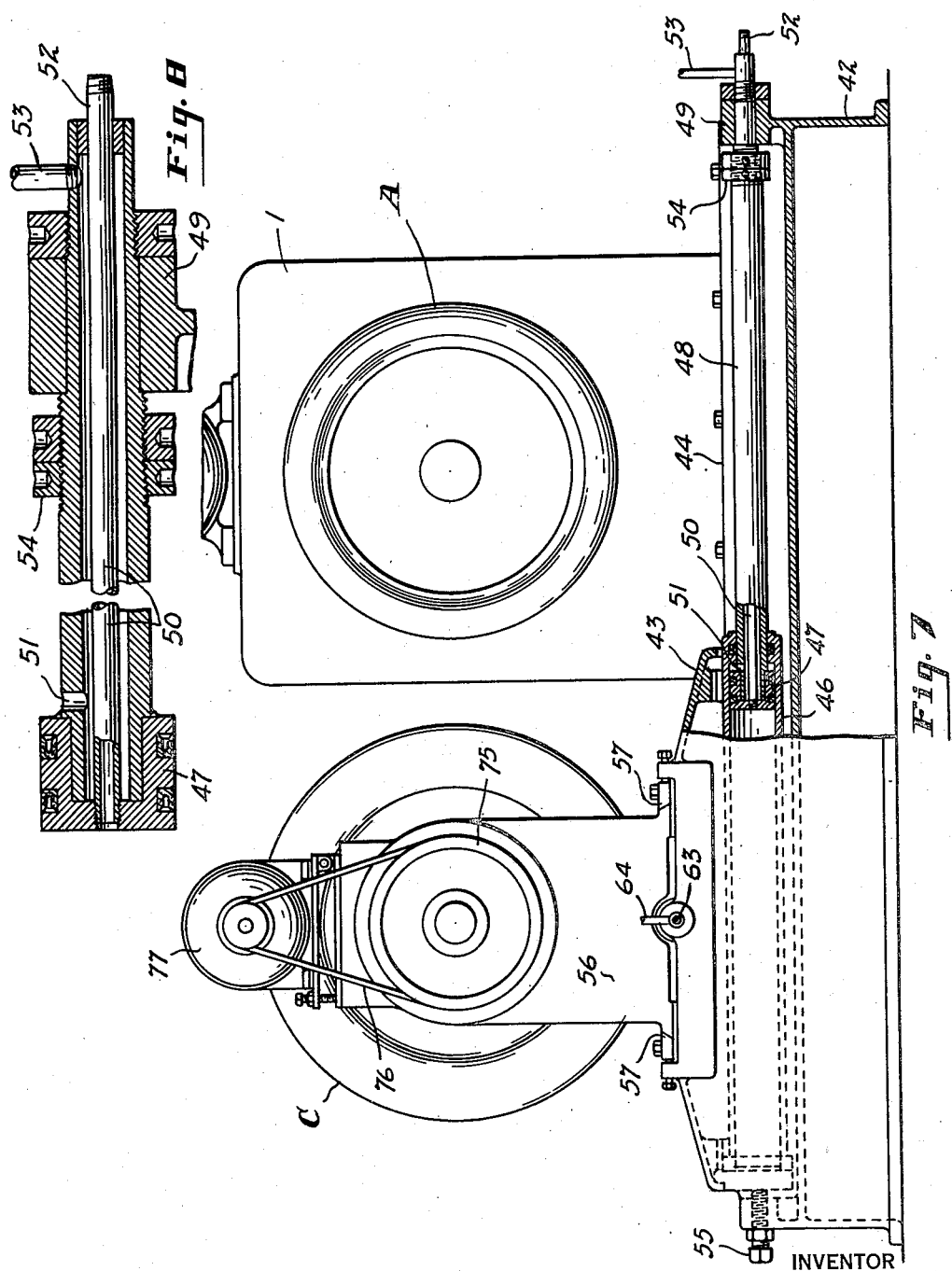

Aug. 8, 1950    R. I. KUFFLER    2,517,889
METHOD AND APPARATUS FOR APPLYING PREFORMED
BANDS TO TIRE BUILDING DRUMS
Filed Feb. 26, 1948    6 Sheets-Sheet 5

INVENTOR.
Roland I. Kuffler
BY Evans & McCoy
ATTORNEYS

Patented Aug. 8, 1950

2,517,889

UNITED STATES PATENT OFFICE 2,517,889

METHOD AND APPARATUS FOR APPLYING PREFORMED BANDS TO TIRE BUILDING DRUMS

Roland I. Kuffler, Detroit, Mich., assignor to The General Tire and Rubber Company, Akron, Ohio, a corporation of Ohio Application February 26, 1948, Serial No. 10,954

12 Claims. (Cl. 154—9)

This invention relates to the building of pneumatic tire casings, and more particularly to a method of and apparatus for applying preformed bands of elastic tire material to a tire building drum.

It is an object of the invention to provide a method by which a band of tacky, uncured stock may be quickly applied to a tire building drum or to tire carcass bands previously applied to the drum.

A further object of the invention is to provide a method of and apparatus for applying bands of elastic tire stock in a stretched condition to the drum so that the contraction of the bands causes outer plies of the tire casing to press radially upon uniformly adhered inner plies, and in the case of fabric reinforced plies to provide a uniform spacing of the reinforcing cords throughout the tire casing.

A further object of the invention is to provide apparatus for quickly and easily accomplishing the transfer of fabric bands or tread stock bands to a tire building drum.

With the above and other objects in view, the invention may be said to comprise the device illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a top plan view of apparatus embodying the invention;

Fig. 2 is a vertical section taken on the line indicated at 2—2 in Fig. 1, showing the expansible band supporting reel;

Fig. 3 is an end view of the expansible reel viewed as indicated by the arrows at 3—3 in Fig. 2;

Fig. 4 is a fragmentary horizontal section taken on the line indicated at 4—4 in Fig. 2;

Fig. 5 is a fragmentary section taken on the line indicated at 5—5 in Fig. 3, showing a portion of the reel expanding cone in elevation;

Fig. 6 is a vertical section taken axially through the transfer cylinder as indicated by the line 6—6 in Fig. 1;

Fig. 7 is an end elevation of the apparatus, a portion of the base and of the transfer cylinder carriage being broken away and shown in vertical section;

Fig. 8 is a view showing the actuating piston for the transfer cylinder carriage in axial section;

Fig. 12 is a top plan view showing the transfer cylinder and reel telescoped for transfer of a band from the reel to the cylinder;

Fig. 13 is a top plan view showing the transfer cylinder withdrawn from the reel after taking the band from the reel;

Fig. 14 is a top plan view showing the transfer cylinder moved to a position axially alined with the tire building drum;

Fig. 15 is a top plan view showing the transfer cylinder and drum telescoped for transfer of the band from the cylinder to the drum;

Fig. 16 shows the transfer cylinder retracted from the tire building drum after transfer of the band of tire material to the drum.

In transferring bands of tire material to a tire building drum by the method of the present invention, the preformed bands are transferred to the tire building drum A from a band holding reel B mounted at the rear of the tire building drum by means of a movable transfer cylinder C.

The reel B is an expansible band support, which as shown in Fig. 3 of the drawings, holds a band D of tire material to polygonal form when it is expanded against the interior of the band.

Figure 9:
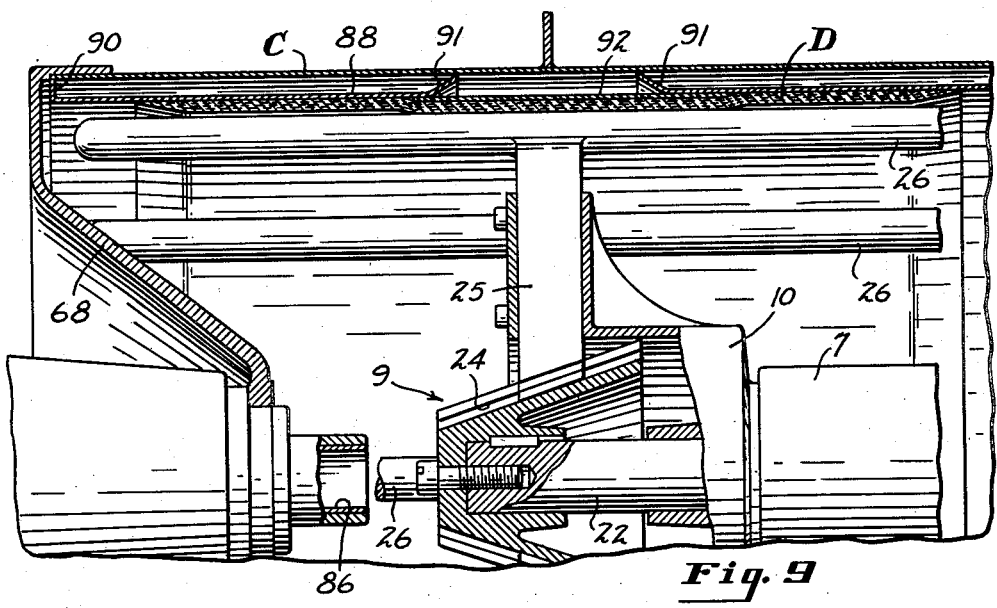
Fig. 9 is a fragmentary sectional view showing the band holding reel within the transfer cylinder and a band of tire material being transferred from the reel to the cylinder.
Figure 10:
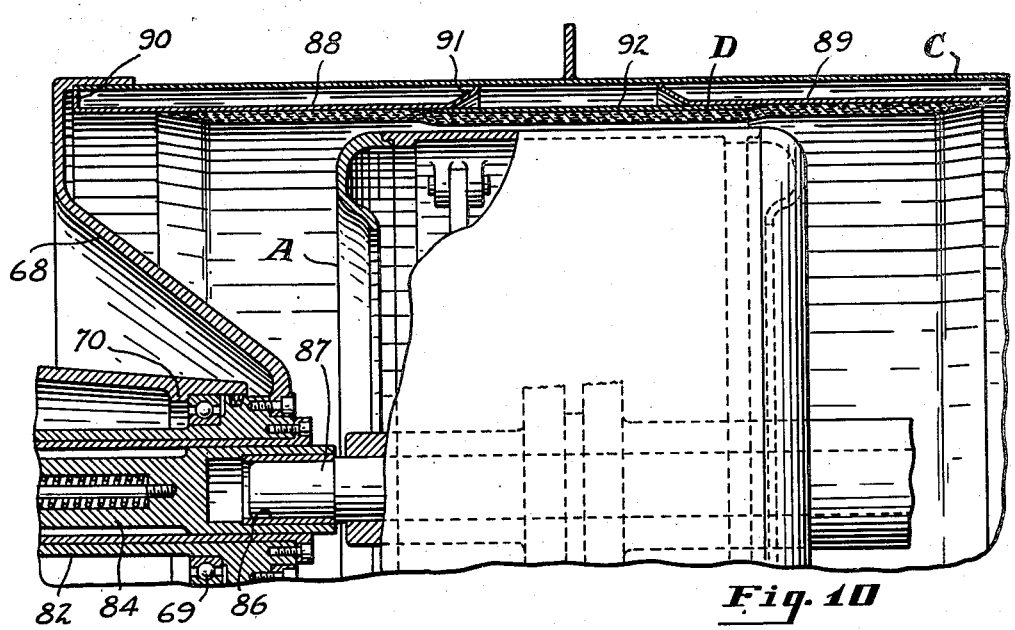
Fig. 10 is a fragmentary sectional view showing the transfer cylinder with a band upon its interior, in a position to transfer the band to a tire building drum.
Figure 11:
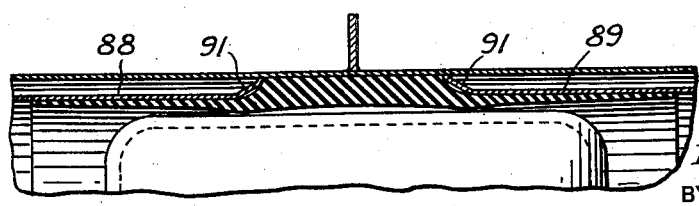
Fig. 11 is a fragmentary sectional view similar to Fig. 10, showing a band of tread stock in the transfer cylinder.
Figure 12:
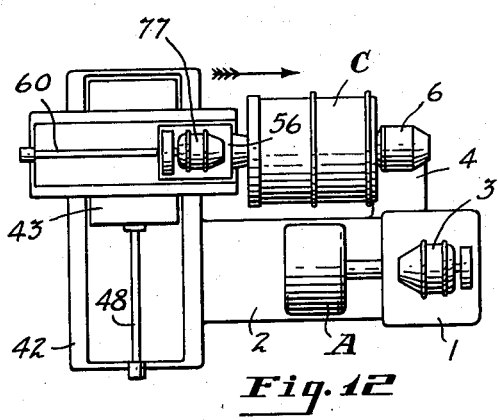
Figs. 12 to 16 show the successive positions of the transfer cylinder with respect to the band holding reel and tire building drum.
Figure 13:
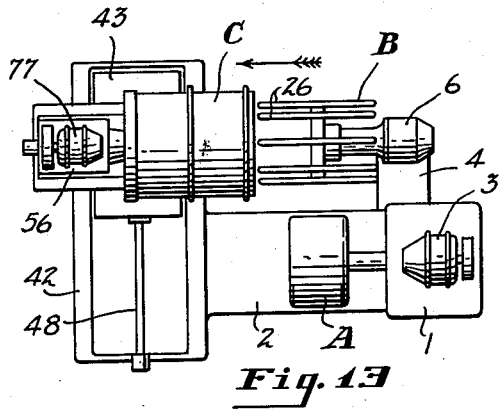
Figure 14:
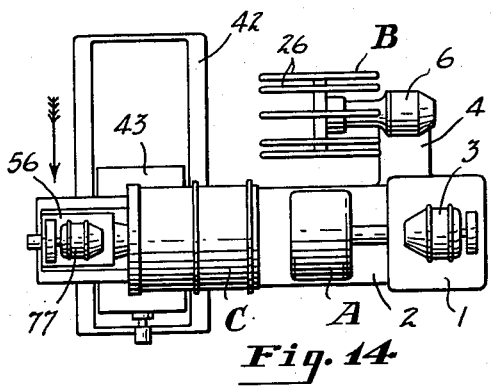
Figure 15:
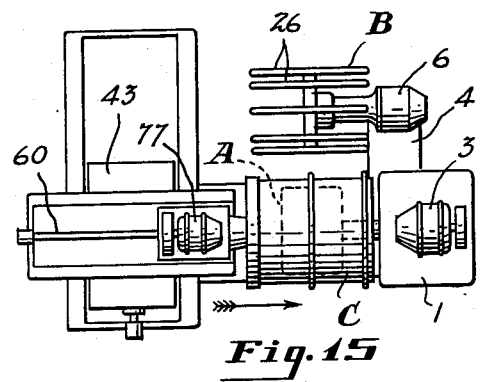
Figure 16:
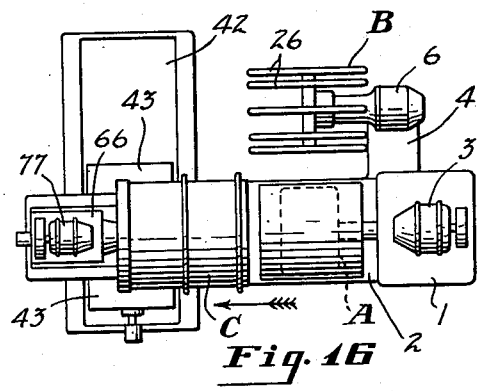
Figure 17:
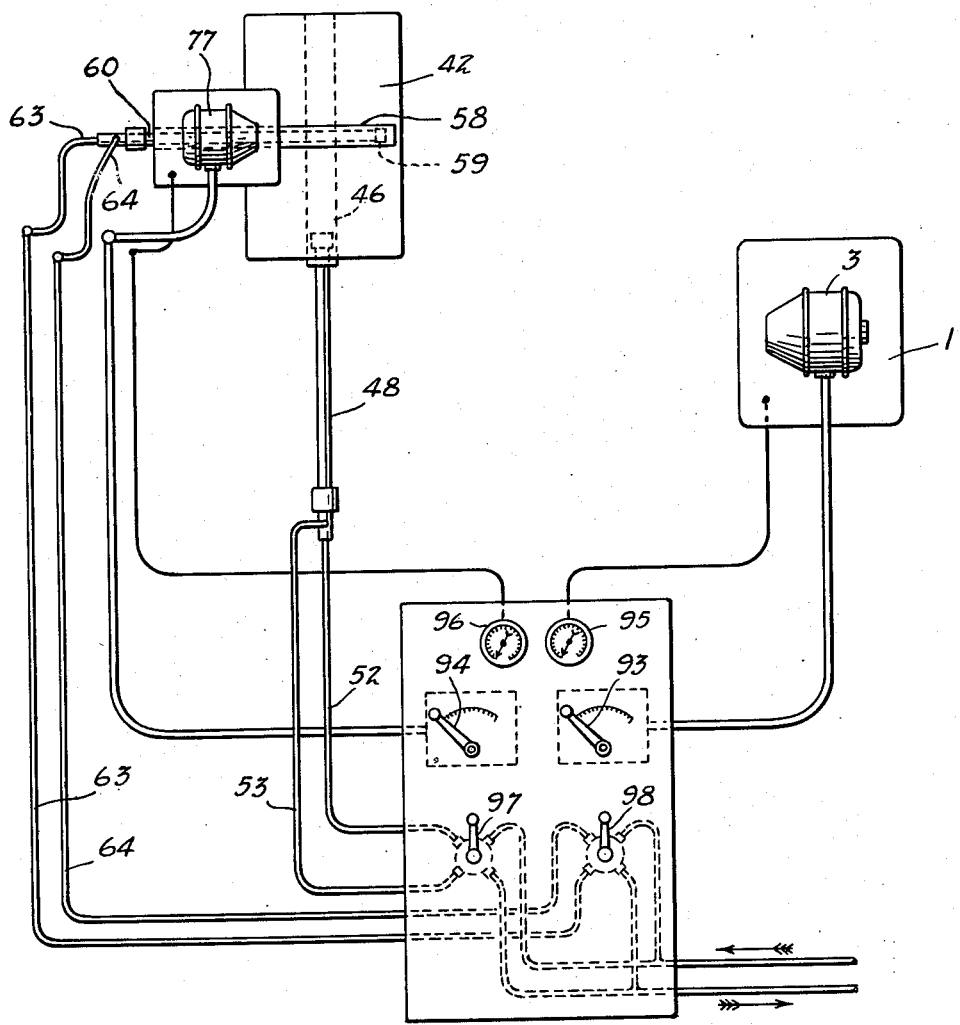
Fig. 17 is a diagrammatic view showing the control panel and connections to the actuating motors.

The transfer drum C is of an internal diameter somewhat greater than that of the tire building drum and of the band D that is to be transferred to the drum, so that when a band is mounted on the reel B the transfer cylinder C can be advanced to a position in which the reel B is telescoped within the cylinder C, after which the reel B may be expanded to press the band D at spaced points against the interior of the cylinder C, whereupon rotation is imparted to the cylinder C causing the reel B and band D to rotate with the cylinder. The speed of rotation is increased until centrifugal force acting upon the band is sufficient to expand the entire band into engagement with the interior of the cylinder C. After the band is so expanded the reel B is contracted to a position clear of the band D and the cylinder C is withdrawn from the reel to the position shown in Fig. 13. While the cylinder C is still being rotated at a speed to hold the band D against the interior thereof, it is moved to the position shown in Fig. 14 where it is in axial alinement with the tire building drum. The cylinder C is then moved axially to a position where the drum A is within the cylinder and the tire building drum is rotated and brought up to a speed substantially the same as that of the transfer cylinder C. The speeds of rotation of the cylinder C and drum A are then simultaneously reduced until the centrifugal force acting upon the band is insufficient to hold it against the interior of the drum C and its elasticity causes it to snap inwardly into tight engagement with the drum A, after which the transfer cylinder C is retracted from the drum A and returned to its original position.

The tire building drum A is supported by a suitable standard 1 mounted upon an elongated base 2 that extends forwardly beneath the drum A, a suitable driving motor 3 being provided for driving the drum A, which may be a conventional collapsible tire building drum.

The base 2 has a laterally extending portion 4 that provides a base for a standard 5 having a housing 6 at the top thereof which is provided with a tubular bearing portion 7 that projects laterally in a direction parallel with the axis of the drum A. A tubular shaft 8 is mounted in the bearing portion 7 and carries a reel support 9 at its inner end which may be formed integrally with the shaft. The reel support 9 has a hollow hub portion 10 and radially disposed guide channels 11 outwardly of the hub portion. The shaft 8 is preferably journaled in suitable antifriction thrust bearings that serve to hold it against axial movements. As herein shown an inner bearing 12 is clamped between a shoulder 13 at the outer end of the reel support 9 and an internal rib 14 in the tubular bearing portion 7 of the housing. An outer bearing 15 for the shaft 8 is clamped between an internal rib 16 of the tubular bearing portion 7 and a threaded collar 17 on the shaft 8.

Adjacent its outer end the shaft 8 has attached thereto a brake ring 18 and outwardly of the brake ring a fluid pressure cylinder 19 that is axially alined with the shaft. The cylinder 19 has a piston 20 provided with a piston rod 21 that is attached at its inner end to an inner shaft 22 slidably fitting in the tubular shaft 8 and connected thereto.

The inner end of the shaft 22 extends beyond the tubular shaft 8 and has an expander cone 23 attached thereto. The cone 23 has axially extending undercut ways 24 formed on its exterior face that receive radially disposed spokes 25 that are slidably mounted in the radial guide channels 11 of the reel support and that carry band engaging bars 26 at their outer ends. Each bar 26 is attached substantially midway between its ends to a spoke 25 and all of the bars are parallel to the central supporting shaft 8.

The radial spokes 25 have inner portions 27 formed to fit in the undercut ways 24 of the expander cone, so that the spokes 25 are simultaneously moved radially outwardly when the cone 23 is moved inwardly and are simultaneously moved inwardly when the cone is moved in an outward direction, the cone 23 serving to uniformly expand or contract the band holding reel when the expanding cone is shifted by means of the fluid pressure cylinder 19.

The cylinder 19, which rotates with the shaft 8, has a head 28 at its outer end which has a cylindrical section 29 of reduced diameter which is journaled in a fixed collar 30. The collar 30 has internal grooves 31 and 32 which communicate with passages 33 and 34 in the head leading to the inner and outer ends of the cylinder 19. Pipes 35 and 36 are connected to the grooves 31 and 32 and flow through the pipes 35 and 36 is controlled by a suitable valve 37 which in one position applies pressure to the outer side of the piston 20 to expand the reel B, and in another position applies pressure to the inner side of the piston 20 to contract the reel, one of the pipes 35 and 36 being connected to a source of pressure and the other to the atmosphere in each position of the valve 37, so that fluid under pressure is permitted to escape from one side of the piston while pressure is being supplied to the opposite side thereof.

When the transfer cylinder is moved to a position in which the reel B is telescoped within it, the valve 37 is actuated to permit sufficient fluid under pressure in the cylinder 19 to expand the reel B against the interior of the cylinder C. After the reel B has been expanded sufficiently to clamp the band D of tire building material against the interior of the cylinder C, rotation is imparted to the cylinder C and the reel B, which is free to rotate in the bearings 12 and 15, turns with the cylinder C. After sufficient speed has been attained to hold the band D tightly against the interior of the cylinder C, the valve 37 is actuated to contract the reel B, after which the transfer cylinder C with the band B held against its interior by centrifugal force, is moved to retracted position and then to a position alined with the drum A.

In order to stop rotation of the reel B after it is disengaged from the cylinder, an external brake member 38 is provided for engagement with the brake ring 18. The brake member 38 may be in the form of an endless inflatable tube attached to a ring 39 that is secured to the housing member 7. The inflatable brake member 38 is normally of an internal diameter slightly greater than the external diameter of the brake member 18 so as to permit free rotation of the reel B. A conduit 40 is connected to the brake member 38 to deliver fluid under pressure thereto, the conduit 40 being controlled by a suitable valve 41 which in one position admits fluid to the brake member, and in another position exhausts fluid from the brake member.

At the end of the base 2 beyond the free end of the drum A, a transverse base member 42 is mounted, which extends at right angles to the axis of the drum A. A carriage 43 is mounted for movement longitudinally of the base 42 which is provided with a carriage guideway which includes beveled guide bars 44 which may be adjusted laterally by means of screws 45. The carriage 43 has a cylinder 46 attached to the bottom thereof, the cylinder 46 being parallel to the way which guides the carriage 43 and at right angles to the axis of the drum A. The cylinder 46 has a piston 47 which is attached to a tubular piston rod 48 which is rigidly attached to a lug 49 at the forward end of the base 42.

Within the tubular piston rod 48 there is mounted a small tube 50 which is attached to the piston 47 and provides a passage centrally through the tubular rod 48 through the piston to the interior of the cylinder at the rear of the piston. The tube 50 is of an external diameter less than the internal diameter of the rod 48, so that a second passage is provided externally thereof through the piston rod. The exterior passage through the rod 48 opens through a port 51 to the interior of the cylinder forwardly of the piston, and the pipe 50 and the exterior passage leading to the port 51 are connected to pipes 52 and 53 through which fluid under pressure may be admitted to either side of the piston to actuate the carriage 43.

The carriage 43, which supports the transfer cylinder C is movable from a position in which the transfer cylinder C is axially alined with the reel B, to a position in which the transfer cylinder is axially alined with the drum A, limit stops being provided for positioning the carriage in the two positions. To position the carriage with the transfer cylinder alined with the drum A, an adjustable stop collar 54 is provided on the piston rod 48 which is engaged by the head of the cylinder 46 to limit the forward movement of the carriage 43. A suitable adjustable stop such as a screw 55 is provided at the rear end of the base 42 to limit the rearward movement of the carriage.

A slide 56 carrying the transfer cylinder C is mounted upon the carriage 43, being guided on the carriage 43 by means of suitable adjustable guide bars 57 for movement at right angles to the line of movement of the carriage 43. On the bottom of the slide 56 there is attached a cylinder 58 which is horizontally disposed parallel to the axis of the drum A and reel B. The cylinder 58 has a piston 59 which is attached to a tubular piston rod 60 that is rigidly attached to a lug 61 on the outer end of the base portion of the carriage 43. A small tube 62 is mounted within the piston rod 60 and establishes communication between a pressure supply pipe 63 through the piston 59 and the inner end of the cylinder 58. The tube 62 is of an external diameter less than the internal diameter of the tubular piston rod 60, providing an outer passage which receives fluid under pressure from a pipe 64 and which delivers into the interior of the cylinder 58 outwardly of the piston 59. Pressure admitted through the pipe 63 moves the slide 56 inwardly toward the reel or drum, and pressure admitted through the pipe 64 retracts the slide.

The transfer cylinder C is attached to a horizontal shaft 65 which is journaled in a housing 66 carried by the slide 56. The shaft 65 has an enlarged inner end 67 to which a cylinder carrying head 68 is attached. The shaft 65 is journaled in the housing 66 in suitable thrust bearings which hold the shaft against endwise movements. As herein shown, the inner bearing 69 for the shaft is a ball thrust bearing clamped between the enlarged portion 67 of the shaft 65 and an internal rib 70 carried by the housing 66. An outer ball thrust bearing 71 is clamped between an internal rib 72 carried by the housing and a threaded collar 73 carried by the shaft 65. Exteriorly of the bearing 71 an externally cylindrical brake member 74 is keyed to the shaft 65 and outwardly of the brake member a pulley 75 is keyed to the shaft. The shaft 65 is driven through a belt 76 running over the pulley 75, by an electric motor 77. A suitable brake member is provided for engagement with the brake member 74 to stop rotation of the cylinder C after the motor 77 is deenergized. As shown herein, the brake member is in the form of an annular inflatable tube 78 which is of an internal diameter less than the diameter of the member 74 so that it is normally free from the inner brake member 74, but which is expanded inwardly upon inflation into engagement with the brake member 74, suitable means such as a pipe 80 being provided for delivering fluid under pressure to the brake member 78. The brake member 78 is attached by suitable means to the housing 66, the attaching means as herein shown being a band 79 encircling the inflatable brake member 78 and secured to the housing 66.

The inner end of the shaft 65 is tubular to provide a socket 81 in which is mounted a cushioning cylinder 82. The cylinder 82 is open at its inner end and receives a plunger 83 that is backed by a spring 84. The cylinder 82 is attached to the shaft 65 to rotate therewith, and the plunger 83 is constrained to rotate with the cylinder and shaft by means of rods 85 attached to the plunger and slidable in an opening in the inner closed end of the cylinder 82. The inner end of the plunger 83 is provided with a bearing socket 86 that is adapted to receive the outer end of the shaft 87 of the drum A to steady the drum during the transfer of the bands of tire material thereto.

The cylinder C with its head 68 is readily detachable from the shaft 65 so that it may be replaced with a cylinder of larger or smaller diameter when desired. The cylinder C is adapted to transfer fabric reinforced carcass bands, and also an endless band of tread stock. In order to enable the cylinder to be used to transfer both the tread stock and the rubberized fabric bands, the cylinder is provided with a pair of substantially identical adapter bands 88 and 89 mounted upon the interior thereof. The bands 88 and 89 are interiorly cylindrical and of a length less than half the length of the cylinder C. Each of the bands has spacing flanges 90 and 91 at its opposite ends, the flanges 90 and 91 projecting outwardly and being of an external diameter to fit within the cylinder C. The flanges 90 are disposed at right angles to the cylinder axis and engage the interior of the cylinder C at opposite ends thereof. The opposite flanges 91 of the adapter bands are disposed at an inclination and the two bands are of a length such that the space between the flanges 91 provides a centrally disposed peripheral recess within the drum to receive the thickened tread portion of a tread band.

An inner removable band 92 of cylindrical form fits within the bands 88 and 89 and covers the tread receiving recess. When the drum C is used for transferring the rubberized fabric bands, the band 92 is employed to cover the tread receiving recess. The band 92 is readily removable so that when it is desired to apply the tread band the central recess is provided for the thickened tread portion.

In operation of the machine, a preformed band D is placed upon the reel B which is expanded enough to take up the slack in the band and hold it in polygonal form in position to permit the transfer cylinder C to be moved over the reel and band to position the band within the transfer cylinder. After the reel B has been telescoped into the cylinder C, the reel is expanded further to clamp the fabric band D between the bars 26 and the interior of the cylinder C. The cylinder C is then rotated and its speed of rotation is gradually increased until the centrifugal force acting upon the band D is sufficient to press the band tightly against the interior of the cylinder C. The reel B is then contracted to free it from the band and the cylinder C is retracted by means of the cylinder 58 to a position clear of the reel. The carriage 43 is then moved by means of the cylinder 46 to move the transfer cylinder C to a position in axial alinement with the tire building drum A.

Pressure is admitted to the cylinder 58 to shift the carriage 56 toward the tire building drum until the shaft 37 of the drum is engaged in the socket 86 of the cylinder supporting shaft 65. The motor 3 is then operated to rotate the tire building drum and the speed of rotation of the drum is gradually increased until it is substantially the same as that of the cylinder C, after which the speeds of rotation of the cylinder C and drum A are simultaneously reduced until the centrifugal force acting upon the band D of tire building material is insufficient to overcome the contractile force acting upon the band due to its elasticity and stretch, whereupon the band will snap out of engagement with the transfer cylinder C and into engagement with the exterior of the drum A, after which the transfer cylinder C is retracted and moved to its rearmost position.

The motors 3 and 77 are preferably so wound that the speed of rotation of either will be decreased upon an increase in load, so that the speeds of the drum and cylinder will be readily equalized if the band should engage the drum before it is entirely freed from the cylinder should the drum and cylinder be rotating at slightly different speeds. It is, therefore, not essential that the speeds of the drum and cylinder be kept exactly the same while their speeds are being reduced.

After the desired forming operations have been performed on the first band applied to the drum, a second band may be transferred from the reel B in the same manner, to the drum exteriorly of the first applied band. After the fabric bands have been applied to the drum, a band of tread stock may be applied in the same manner.

In order to conveniently control the cylinder driving motor 77 and drum driving motor 3, suitable independently operable controllers 93 and 94 may be mounted at a convenient point side by side, the controller 93 serving to control the operation of the motor 3 and vary the speed thereof while the controller 94 similarly controls the motor 77. In order to enable the operator to properly control the speeds of rotation of the transfer cylinder and the tire building drum, suitable tachometers 95 and 96 may be provided adjacent the controllers 93 and 94 to show the speeds of rotation of the transfer cylinder and the tire building drum.

For controlling the movements of the carriage 43 and slide 56 for shifting the transfer cylinder to its various positions, suitable four-way valves 97 and 98 may be provided for controlling the flow through the pipes 52 and 53 to and from the cylinder 46, and through the pipes 63 and 64 to and from the cylinder 58.

It is to be understood that variations and modifications of the specific devices herein shown and described for purposes of illustration, may be made without departing from the spirit of the invention.

What I claim is:

1. The herein described method of applying bands of elastic material to a tire building drum which comprises forming an endless band of said material, expanding said band against the interior of a hollow cylinder of a circumference greater than that of the band and greater than that of said drum, rotating said cylinder and band to apply centrifugal force to said band to hold it against the interior of the cylinder, positioning the tire building drum within the cylinder and expanded band, and decelerating the cylinder to relieve the centrifugal force acting on the band and cause the band to contract upon the tire building drum.

2. The herein described method of applying bands of elastic material to a tire building drum which comprises forming an endless band of said material, expanding said band against the interior of a hollow cylinder of a circumference greater than that of the band and greater than that of said drum, rotating said cylinder and band to apply centrifugal force to said band to hold it against the interior of the cylinder, positioning the tire building drum within the cylinder and expanded band, rotating the drum at substantially the same speed as the cylinder, and simultaneously decelerating the cylinder and drum to transfer the band from the cylinder to the drum.

3. The herein described method of applying bands of elastic tire forming material to a tire building drum which comprises forming an endless band of said material, inserting said band into a hollow cylinder having an internal circumference greater than the circumference of the tire building drum and greater than the circumference of the band and pressing circumferentially spaced portions of the band radially outwardly against the interior of said cylinder, rotating said cylinder and band to apply centrifugal force to said band to expand the same against the interior of the cylinder, positioning of the tire building drum within the cylinder and expanded band while the band is held by centrifugal force against the interior of the cylinder, and decelerating said cylinder to relieve the centrifugal force acting upon the band and allow the band to contract upon the tire building drum.

4. The herein described method of applying bands of elastic tire forming material to a tire building drum which comprises forming an endless band of said material, inserting said band into a hollow cylinder having an internal circumference greater than the circumference of the tire building drum and greater than the circumference of the band and pressing circumferentially spaced portions of the band radially outwardly against the interior of said cylinder, rotating said cylinder and band to apply centrifugal force to said band to expand the same against the interior of the cylinder, positioning the tire building drum within the cylinder and expanded band while the band is held by centrifugal force against the interior of the cylinder, rotating said drum at substantially the same speed as the cylinder, and simultaneously decelerating the drum and cylinder to transfer the band from the cylinder to the drum.

5. Apparatus for placing preformed bands of elastic tire building material on a tire building drum comprising a transfer cylinder of greater diameter than the drum and having an open end to receive the drum, means for placing a band within said cylinder in engagement with the interior surface thereof, means for rotating said cylinder to hold the band by centrifugal force against the interior of the cylinder, and means for positioning the drum within the cylinder to receive the band.

6. Apparatus for placing preformed bands of elastic tire building material on a tire building drum comprising a transfer cylinder of greater diameter than the drum and having an open end to receive the drum, a band holder having means for supporting a band in position to enter said cylinder and for expanding the band into engagement with the interior of the cylinder, means for rotating the cylinder to hold the band against the interior thereof by centrifugal force, and means for positioning the drum within the cylinder to receive the band.

7. Apparatus for placing preformed bands of elastic tire building material on a tire building drum comprising a transfer cylinder of greater diameter than the drum and having an open end to receive the drum, a rotatable band holder having radially movable band supporting members engaging the interior of the band, means for positioning said band and band supporting members within said cylinder and for actuating said members to expand said band into engagement with the interior of the cylinder, means for rotating the cylinder to hold the band against the interior thereof by centrifugal force, and means for positioning the drum within the cylinder to receive the band.

8. Apparatus for placing preformed bands of elastic tire building material on a tire building drum comprising a rotatably mounted band holder having radially movable members engageable with the interior of the band, a transfer cylinder of greater diameter than said drum and movable from a position axially alined with said holder to a position axially alined with said drum, means for imparting relative axial movements to the cylinder and holder and to the cylinder and drum to telescope the holder and cylinder and the drum and cylinder, means for actuating said radially movable members to press the band against the interior of the cylinder, and means to rotate said cylinder to hold said band against the interior thereof by centrifugal force.

9. Apparatus for placing preformed bands of elastic tire building material on a tire building drum comprising a rotatably mounted band holder having radially movable members engageable with the interior of the band, a movable transfer cylinder of greater diameter than the drum, means for alining said cylinder axially with said holder and for telescoping said holder and cylinder, means for alining said cylinder axially with said drum and for telescoping said drum and cylinder, means for actuating said radially movable members to press the band against the interior of the cylinder, and means for rotating the cylinder to hold the band against the interior thereof by centrifugal force.

10. Tire building apparatus comprising two stationary supports positioned side by side and having parallel shafts journaled therein and projecting laterally in the same direction therefrom, a tire building drum mounted on one of said shafts, a band holder mounted on the other of said shafts and comprising a series of angularly spaced radially movable members having band engaging bars at their outer ends that are disposed parallel to the band holder shaft, a carriage mounted for movement transverse to said shafts adjacent their free ends, a transfer cylinder mounted on said carriage for successive axial alinement with said shafts, said cylinder being mounted for axial movement and being of a diameter to receive either said holder or said drum, means for actuating said radially movable members to expand the band into engagement with said cylinder, and means for rotating said cylinder to hold a band by centrifugal force against the interior thereof.

11. Tire building apparatus comprising two stationary supports positioned side by side and having parallel shafts journaled therein and projecting laterally in the same direction therefrom, a tire building drum mounted on one of said shafts, a band holder mounted on the other of said shafts and comprising a series of angularly spaced radially movable members having band engaging bars at their outer ends that are disposed parallel to the band holder shaft, a carriage mounted for movement transverse to said shafts adjacent their free ends, a transfer cylinder mounted on said carriage for successive axial alinement with said shafts, said cylinder being mounted for axial movement and being of a diameter to receive either said holder or said drum, fluid pressure operated means for shifting said carriage, for shifting said cylinder axially and for actuating said radially movable members, and means for driving said cylinder to hold a band by centrifugal force against the interior thereof.

12. Apparatus for placing preformed bands of elastic tire forming material on a tire building drum comprising a rotatable transfer cylinder having an open end to receive a tire building drum, said cylinder having a central circumferential recess upon the interior thereof to receive a tread band, and a removable cylindrical cover for said recess fitting within said cylinder.

ROLAND I. KUFFLER.

REFERENCES CITED

The following references are of record in the file of this patent:

UNITED STATES PATENTS

| Number | Name | Date |
| --- | --- | --- |
| 1,455,260 | Midgley | May 15, 1923 |
| 1,499,679 | Midgley | July 1, 1924 |
| 1,757,750 | Stevens | May 6, 1930 |
| 1,762,146 | Abbott | June 10, 1930 |
| 1,762,824 | Lehman | June 10, 1930 |
| 1,789,858 | Backdahl | Jan. 20, 1931 |
| 1,921,594 | Thompson | Aug. 8, 1933 |
| 2,028,695 | Stevens | Jan. 21, 1936 |